United States Patent
Jaffry et al.

(10) Patent No.: US 12,513,542 B2
(45) Date of Patent: Dec. 30, 2025

(54) ANOMALY PREDICTION IN OPENRAN MOBILE NETWORKS USING SPATIO-TEMPORAL CORRELATION

(71) Applicant: Dell Products L.P., Round Rock, TX (US)

(72) Inventors: Syed Shan-E-Raza Jaffry, Ottawa (CA); Afshin Sahabi, Ottawa (CA); Ramy Atawia, Kanata (CA)

(73) Assignee: DELL PRODUCTS L.P., Round Rock, TX (US)

( * ) Notice: Subject to any disclaimer, the term of this patent is extended or adjusted under 35 U.S.C. 154(b) by 713 days.

(21) Appl. No.: 17/897,942

(22) Filed: Aug. 29, 2022

(65) Prior Publication Data
US 2024/0073716 A1    Feb. 29, 2024

(51) Int. Cl.
H04W 24/08    (2009.01)
H04L 41/147    (2022.01)

(52) U.S. Cl.
CPC .......... *H04W 24/08* (2013.01); *H04L 41/147* (2013.01)

(58) Field of Classification Search
CPC .............................. H04W 24/08; H04L 41/147
See application file for complete search history.

(56) References Cited

FOREIGN PATENT DOCUMENTS

WO    WO-2017007474 A1 *    1/2017    ........ H04W 28/0284

OTHER PUBLICATIONS

Hadi et al., "Big Data Analytics for Wireless and Wired Network Design: A Survey", Computer Networks, vol. 132, 2018, pp. 180-199 (Year: 2018).*
Kumar et al., "O-RAN based proactive ANR optimization", IEEE Globecom Workshops, 2020 (Year: 2020).*
Zhang, et al., "Anomaly Detection Approach for Urban Sensing Based on Credibility and Time-Series Analysis Optimization Model," in IEEE Access, vol. 7, pp. 49102-49110, 2019, doi: 10.1109/ACCESS.2019.2909967, Date of Publication: Apr. 11, 2019.
Jaffry, et al., "Data-Driven Semi-Supervised Anomaly Detection Using Real-World Call Data Record," 2020 IEEE Wireless Communications and Networking Conference Workshops (WCNCW), 2020, pp. 1-6, doi: 10.1109/WCNCW48565.2020.9124782, Date of Conference: Apr. 6-9, 2020.

(Continued)

*Primary Examiner* — Joseph A Bednash
(74) *Attorney, Agent, or Firm* — Amin, Turocy & Watson, LLP

(57) ABSTRACT

Generally provided is a radio system that can comprise a lower-level controller, of a radio network, that is responsive to and provided at a level of hierarchy lower than an upper-level controller of the radio network, and the upper-level controller that generates a cell-level prediction of an anomaly at a first cell of a radio network based on cell-level data determined by the lower-level controller, wherein the upper-level controller generates a global prediction, based on the cell-level prediction, of propagation of the anomaly to a second cell of the radio network. The upper-level controller can generate the global prediction based on cross correlation of a first metric value, of the cell-level data, measured according to a defined metric, from the first cell and a second metric value, measured according to the defined metric, from the second cell of the radio network.

20 Claims, 10 Drawing Sheets

(56) References Cited

OTHER PUBLICATIONS

Oran Alliance, "Transforming Radio Access Networks Towards Open, Intelligent, Virtualized and Fully Interoperable RAN," https://www.o-ran.org, Retrieved from the Internet: Aug. 2, 2022.
International Preliminary Report on Patentability received for PCT Application Serial No. PCT/US2023/031281 dated Mar. 13, 2025, 16 pages.
Communication pursuant to Rules 161(1) and 162 EPC received for EP Patent Application Serial No. 23776151.5 dated Apr. 8, 2025, 3 pages.
International Search Report and Written opinion received for PCT Application Serial No. PCT/US2023/031281 dated Dec. 5, 2023, 22 pages.
Hadi et al., "Big Data Analytics for Wireless and Wired Network Design: a Survey", Computer Networks, vol. 132, 2018, pp. 180-199.
Kumar et al., "O-RAN Based Proactive ANR Optimization", IEEE Globecom Workshops, 2020, 4 pages.
Coronado et al., "Zero Touch Management: A Survey of Network Automation Solutions for 5G and 6G Networks", IEEE Communications Surveys & Tutorials, vol. 24, No. 4, 2022, pp. 2535-2578.
Lakhina et al., "Diagnosing Network-Wide Traffic Anomalies ", ACM SIGCOMM Computer Communication Review, Aug. 30-Sep. 3, 2004, pp. 219-230.

\* cited by examiner

800 ⬛

```
┌─────────────────────────────────────────────────────────────────────────┐
│ Determining, by a network equipment that is part of a radio network and │
│ comprising a processor, that a performance metric at the first cell of  │
│ the radio network has changed by at least a defined deviation from a    │
│ specification for the performance metric. 802                           │
└─────────────────────────────────────────────────────────────────────────┘
```

Determining, by a network equipment that is part of a radio network and comprising a processor, that a performance metric at the first cell of the radio network has changed by at least a defined deviation from a specification for the performance metric. 802

↓

Generating, by the network equipment, based on the determining, a cell-level prediction of an anomaly at the first cell. 804

↓

Initiating, by the network equipment, the generation of the cross correlation and the spatio-temporal correlation upon generating a cell-level prediction of an anomaly having occurred at the first cell. 806

↓

Generating, by the network equipment, a cross correlation of a first metric value, measured according to a defined metric, from a first cell of the radio network and a second metric value, measured according to the defined metric, from a second cell of the radio network. 808

↓

Generating, by the network equipment, a spatio-temporal correlation, for the second cell, defining a spatio-temporal relationship between the first cell and the second cell. 810

↓

Generating, by the network equipment, based on the result of the spatio-temporal correlation, a distance-based threshold that is used to generate the global prediction. 812

↓

Generating, by the network equipment, a global prediction, based on the cross correlation and on the spatio-temporal correlation, of propagation of an anomaly from the first cell to the second cell. 814

↓

Communicating, by the network equipment, the global prediction to a device of the network equipment at the second cell. 816

↓

Identifying, by the network equipment, a subset of additional cells of the radio network, excluding the first cell and the second cell, that is determined to be spatio-temporally correlated to the first cell or to the second cell, wherein the global prediction is further generated for and communicated to the subset of additional cells. 818

↓

Directing, by the network equipment, allocation of resources to the second cell to address the global prediction by performing a mitigation or elimination of a potential for the anomaly to occur at the second cell, or causing, by the network equipment, the second cell to allocate resources to address the global prediction by the mitigation or the elimination of the potential for the anomaly to occur at the second cell, by the communicating to the second cell. 820

FIG. 8

ANOMALY PREDICTION IN OPENRAN MOBILE NETWORKS USING SPATIO-TEMPORAL CORRELATION

BACKGROUND

Modern cellular systems continue to advance, where various components of a respective network can be disaggregated and/or managed by multiple vendors. In this way, detection of anomalies and understanding propagation of such anomalies within a radio network can be difficult. An anomaly, being a deviation of a performance parameter from a usual or specified value, can result in varying qualities of service, available access, and/or the like for different user entities of a network, and/or for different vendors of the network.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Generally provided is a system for determining a cell-level prediction of occurrence of an anomaly at a cell of a radio network, and based on this cell-level prediction, determining a global prediction of propagation of the anomaly to one or more other cells of the radio network.

An example radio system can comprise a lower-level controller, of a radio network, that is responsive to and provided at a level of hierarchy lower than an upper-level controller of the radio network, and the upper-level controller that generates a cell-level prediction of an anomaly at a first cell of a radio network based on cell-level data determined by the lower-level controller, wherein the upper-level controller generates a global prediction, based on the cell-level prediction, of propagation of the anomaly to a second cell of the radio network.

An example method can comprise generating, by network equipment that is part of a radio network and comprising a processor, a cross correlation of a first metric value, measured according to a defined metric, from a first cell of the radio network and a second metric value, measured according to the defined metric, from a second cell of the radio network, generating, by the network equipment, a spatio-temporal correlation, for the second cell, defining a spatio-temporal relationship between the first cell and the second cell, and communicating, by the network equipment, prediction information, defining a global prediction, based on the cross correlation and on the spatio-temporal correlation, of propagation of an anomaly from the first cell to the second cell, to device of the network equipment at the second cell.

An exemplary non-transitory machine-readable medium can comprise executable instructions that, when executed by a processor, of a controller of network equipment of a radio network communicatively coupled to a group of cells of the radio network, facilitates performance of operations. The operations can comprise obtaining, by the processor, from a cell of the group of cells, a first metric defining a performance of the fist cell, obtaining, by the processor, from a subset of additional cells of the group of cells, respective second metrics defining respective performances of the additional cells of the subset, performing, by the processor, a primary classification of the additional cells of the subset based on a primary cross correlation of the first metric and the second metrics to one another, and communicating, by the processor, to the subset, indication data comprising indication of a propagation of an anomaly that has occurred at the radio network to the subset of the group of cells.

An advantage of one or more embodiments of the aforementioned radio system, method and/or non-transitory machine-readable medium can be determining by the radio system a proactive prediction of anomaly occurrence. Rather than responding reactively, the radio system defined herein can, based on distance between cells and/or based on movement speed of users at and/or between cells, determine propagation of an anomaly at the radio network. Indeed, via proactive analysis of an anomaly, movement direction of the anomaly, and/or speed of movement of the anomaly, can be determined such as to proactively allocate resources so as to mitigate or prevent the anomaly at one or more cells of the network. This can be desired as compared to excessive delay in addressing an anomaly due to reactive anomaly metric analysis.

Yet another advantage can be employment of various types of metrics to determine propagation, such as from sources internal and/or external to the radio network. Sources internal to the radio network can comprise handover rates, traffic type, and/or the like. Sources external to the radio network can comprise weather data providers, social networks and/or user devices, such as those that have accessed a cell of the radio network.

Yet another advantage of the one or more embodiments described herein can be allowing for predictive maintenance of network equipment of cells of the network, such as based on information learned from metrics defining the propagation of an anomaly.

Even further, another advantage can be reduction in cost, such as time, energy, manual labor, power and/or the like that is directed to troubleshooting a radio network anomaly, and instead ability to at least partially target particular cells, such as relative to a particular temporal range, to mitigate and/or prevent KPI degradation that can be caused by an anomaly.

Moreover, in response to anomaly prediction, anomaly propagation tracking and/or addressing anomalies, satisfaction of user entities of a radio network can be increased, which can lead to greater potentials related to use of the radio network.

BRIEF DESCRIPTION OF THE DRAWINGS

The technology described herein is illustrated by way of example and not limited in the accompanying figures, in which like reference numerals indicate similar elements.

FIG. 7 also illustrates a flow chart of processes that can be performed by the radio network as depicted at FIG. 3, in accordance with one or more embodiments and/or implementations described herein.

FIG. 8 illustrates a process flow diagram of a method of root cause investigation of an anomaly of the radio network of FIG. 3, in accordance with one or more embodiments and/or implementations described herein.

DETAILED DESCRIPTION

Overview

Figure 1:
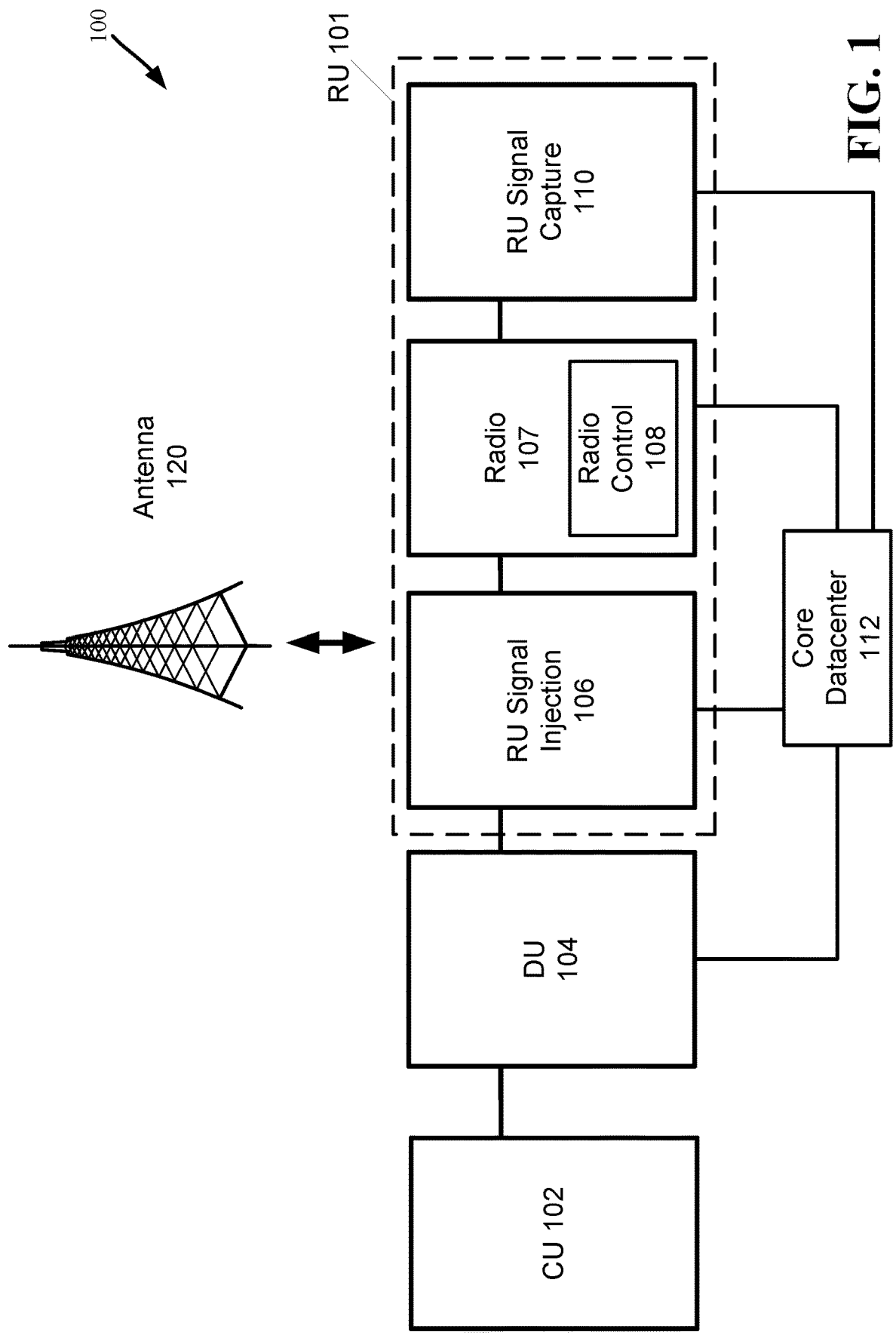
FIG. 1 illustrates a schematic representation of example elements of a radio network, in accordance with one or more embodiments and/or implementations described herein.

The technology described herein is generally directed towards a process to, based on a prediction or an occurrence of an anomaly at a cell of a radio network, predict a propagation of the anomaly to one or more other cells of the radio network. The prediction can, in one or more embodiments, provide timing for the propagation. The anomaly can be defined as a deviation of a performance parameter and/or defined specification of the radio network, such as compared to one or more defaults, usually observed values and/or historical performances.

In existing frameworks, since O-RAN architecture is based on disaggregated nodes, it can be difficult to proactively determine movement of an anomaly within a network. Issues and failures with radio networks, such as cellular networks, such as due to anomalies, often can lead to abnormal values in network key performance indicators (KPIs). Indeed, currently existing frameworks employ reactive actions based on feedback and data from during or after an anomaly has occurred. This can cause excessive delay in implementation of mitigating or preventive measures, thus frustrating customers (e.g., user entities) of the radio network. Further, because propagation is not determined, excess troubleshooting is employed such as at cells or at times where no anomaly is occurring or is likely to occur. That is, spatio-based resource allocation is not employed, such as due to not understanding movement or direction of propagation of an anomaly. Additionally and/or alternatively, temporal-based resource allocation is not employed, such as due to not understanding how quickly and/or when propagation of an anomaly will likely occur.

To account for one or more of these deficiencies, one or more systems, methods and/or non-transitory computer readable mediums are defined herein that can detect and/or predict likely propagation of an anomaly within a radio network.

That is, detecting network KPI anomalies can be a useful method to identify potential network issues such as misconfiguration and/or various resource exhaustions. The progression of KPIs at one or more cells of a radio network can be used to track anomaly movement (e.g., propagation) in the network. Once the propagation is identified, the radio network itself or an entity corresponding to the radio network can take corrective action such as by fixing a configuration and/or deploying extra resources via radio interface controls to mitigate and/or prevent the anomaly from occurring at one or more cells (e.g., to mitigate and/or prevent the propagation).

This analysis can be based on in-network data provided by network resources, such as based on degrading KPIs. In one or more embodiments, information (e.g., data, metrics, metadata, values and/or the like) can be obtained from an external source for use in predicting the propagation of an anomaly. For example, user entity data, such as user movement direction of user entities accessing the radio network, can be employed to determine direction of propagation of an anomaly. In another example, other user entity data, such as user velocity of user entities accessing the radio network, can be employed to determine timing of propagation of an anomaly. Without being limited, other external source data can comprise weather data (e.g., weather reports) and/or social network data (e.g., event locations, social network traffic).

That is, generally a framework is provided to determine, by network equipment of a radio network, a proactive prediction of anomaly occurrence. By responding proactively, such as based on distance between cells and/or based on movement speed of users at and/or between cells, a radio network described herein can determine propagation of an anomaly at the radio network. This can allow for allocation of resources so as to mitigate or prevent the anomaly at one or more cells of the network. Likewise, this can allow for predictive maintenance of network equipment of cells of the network, such as based on information learned from metrics defining the propagation of an anomaly. As a result, in response to anomaly prediction, anomaly propagation tracking and/or addressing anomalies, satisfaction of user entities of a radio network can be increased, which can lead to greater potentials related to use of the radio network.

To provide these one or more operations and/or features, reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power, manual labor, signal power, size, weight and/or the like.

As used herein, the term "resource" can refer to power, money, memory, processing power, bandwidth and/or the like.

Example Radio System Architectures

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architecture 100 as illustrated at FIG. 1, and/or systems thereof, can further comprise one or more computer and/or computing-based elements described herein with reference to a computing environment, such as the computing environment 1000 illustrated at FIG. 10. In one or more described embodiments, computer and/or computing-based elements can be used in connection with implementing one or more of the systems, devices, components and/or computer-implemented operations shown and/or described in connection with FIG. 1 and/or with other figures described herein.

Turning now to FIG. 1, a high-level radio network architecture is illustrated at 100. The radio system 100 can comprise a central unit (CU) 102, distributed unit (DU) 104 (also herein referred to as a DU portion 104) and a radio unit (RU) 101. The CU 102 can comprise protocol layers and can be responsible for various protocol stack functions. The RU 101 can comprise a radio unit (RU) signal injection portion 106 (also herein referred to as an RU signal injection portion 106), the radio control 108, and an RU signal capture portion 110. Generally, the DU portion 104 can provide both baseband processing and RF functions. The RU signal capture portion 110 can take signals from a respective antenna 120 and convert the RF signal into a data signal, and vice versa. In one or more embodiments, the RU signal capture portion 110 can analyze data captured. The DU portion 104 and RU portion 106 can provide data to, and receive data from, the core datacenter 112 and/or central management system.

Figure 2:
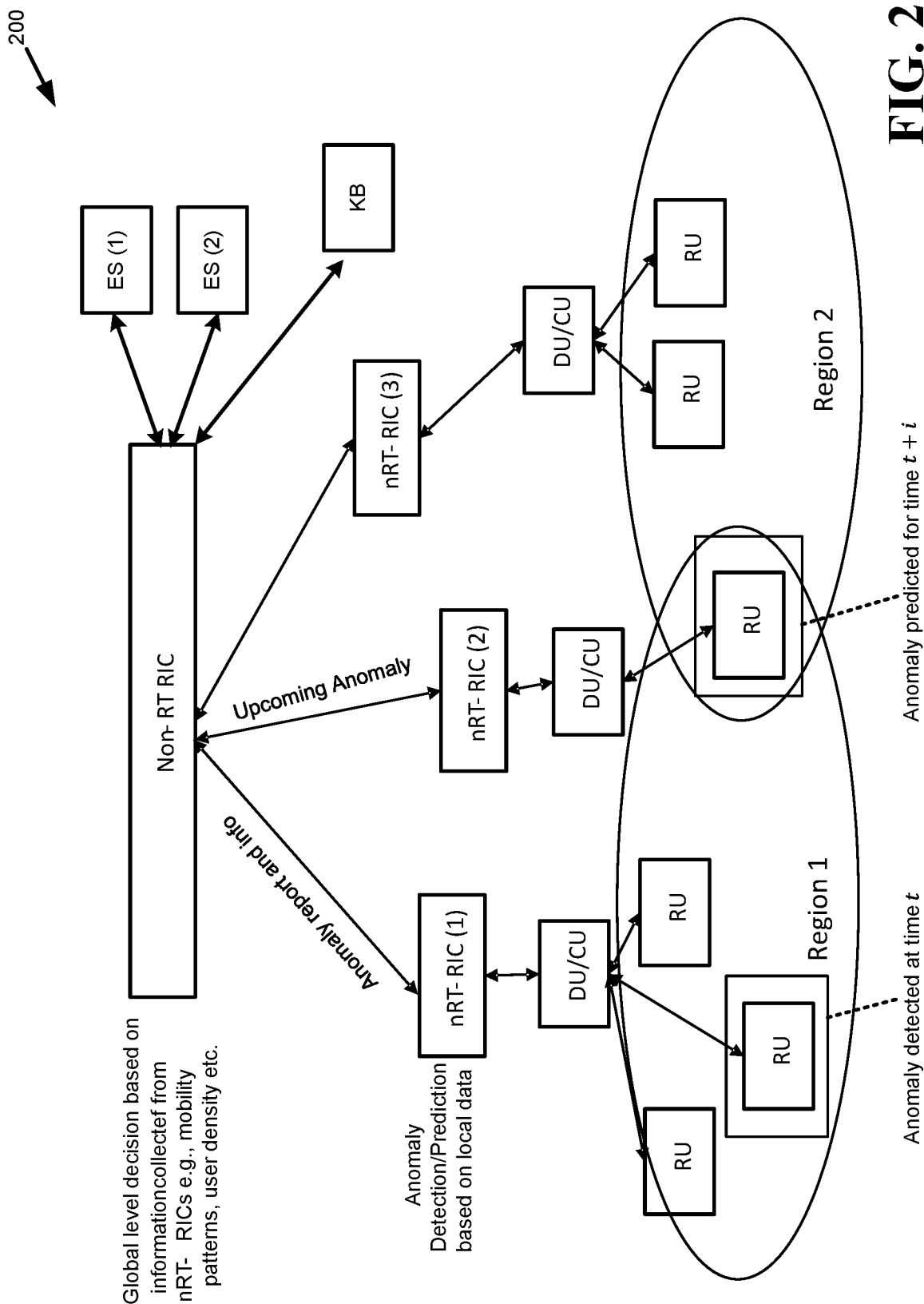
FIG. 2 illustrates an exemplary O-RAN architecture topology of the radio network of FIG. 1, in accordance with one or more embodiments and/or implementations described herein.

Turning next to FIG. 2, an example of another radio network architecture 200 is illustrated, in connection with the high-level radio network architecture 100 of FIG. 1. Comprised by the radio network architecture 200 is an upper-level controller, such as a non-real time radio intelligent controller (Non-RT RIC). A plurality of lower-level controllers, such as near real time radio intelligent controllers (nRT-RICs) are communicatively coupled to and transmit data to the Non-RT RIC. Each nRT-RIC is communicatively coupled to a respective DU/CU to which is respectively communicatively coupled one or more RUs. User entities, such as devices of users, can request access to an RU to obtain access to the radio network architecture 200, also herein referred to her as a radio network 200.

The upper-level Non-RT RIC, as illustrated, is at a higher level of hierarchy than the lower-level nRT-RICs. The lower-level nRT-RICs are responsive to, and can provide information to, the upper-level Non-RT RIC. That is, the nRT-RICs each can oversee and control a plurality of RUs, and can provide particular control to the RUs that can be RU-specific. Differently, the Non-RT RIC can oversee the nRT-RICs and generally can oversee and provide general control of the plurality of RUs communicatively coupled to the various nRT-RICs, such as generally as control of the plurality of RU's as a group.

An anomaly that has occurred at the radio network 200 can, for example, occur at a cell, such as comprising one or more RUs. For example, as illustrated, an anomaly can be detected by nRT-RIC (1) at an RU in Region 1. Generally, based on data from the radio network 200, such as from the RUs and/or nRT-RICs, from one or more external sources (ESs), and/or from historical data accessible by the Non-RT RIC, such as from one or more knowledge databases (KB), a propagation of the anomaly can be investigated and/or at least partially determined. For example, based on a global prediction from the Non-RT RIC, communication can be provided to either nRT-RIC (1) or nRT-RIC (2) regarding propagation of the anomaly to other RUs and/or other regions, such as to Region 2. As illustrated, the anomaly can be predicted, such as by the Non-RT RIC to move spatially (e.g., towards Region 2 and towards an RU controlled by nRT-RIC (2)) and/or temporally (e.g., at a time $\underline{t}+i$, where the initial anomaly occurred at time t).

It is appreciated that one or more other radio networks that can provide one or more operations as will be described herein can have different topology or different architecture. In one or more embodiments, one or more aspects (e.g., nodes) of the network topology 200 can be omitted. In one or more embodiments, one or more additional aspects (e.g., nodes) can be added to a network topology. In one or more embodiments, any one or more connections (e.g., between aspects, such as nodes) can be different.

Figure 3:
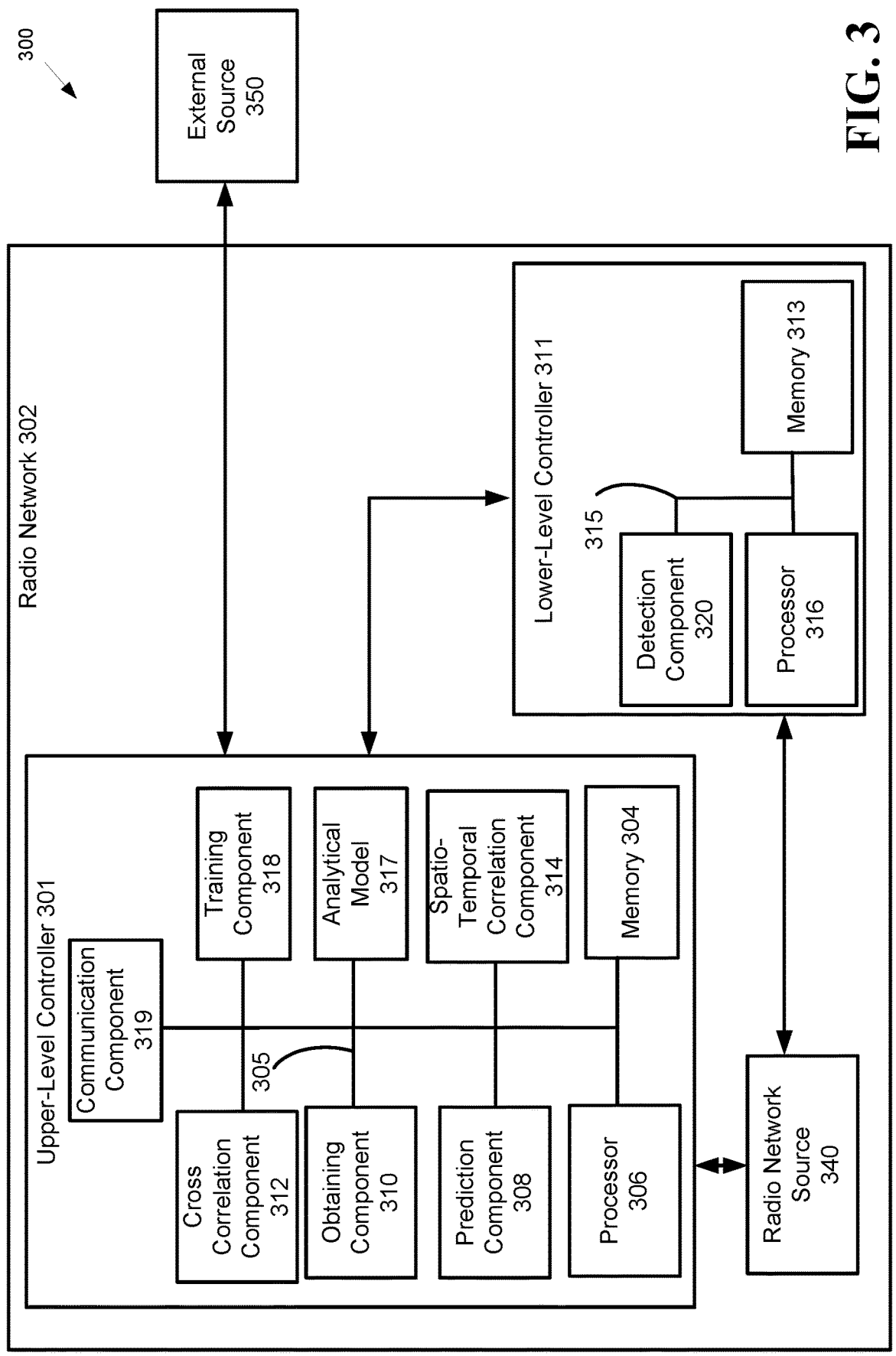
FIG. 3 illustrates a schematic representation of a portions of another radio network, which portions can predict propagation of an anomaly at the radio network, in accordance with one or more embodiments and/or implementations described herein.

Turning next to FIG. 3, an example non-limiting system 300 is illustrated comprising another exemplary radio network 302 and at least one external source 350. The radio network 302 can be at least communicatively coupled to the external source 350 by any suitable method. The radio network 302 can comprise at least one radio network source 340, such as an RU, cell comprising one or more RUs, or an upper-level controller (e.g., nRT-RIC). The radio network 302 also can comprise an upper-level controller 301 and a lower-level controller 311. The upper-level controller 301, such as a Non-RT RIC, can comprise a memory 304, bus 305, processor 306, prediction component 308, obtaining component 310, cross correlation component 312, spatio-temporal correlation component 314, analytical model 317, training component 318, and/or communication component 319. The lower-level controller 311, such as a nRT-RIC, can comprise a memory 313, bus 315, processor 316, and/or detection component 320.

Discussion first turns to the processor 306, memory 304 and bus 305 of the upper-level controller 301.

In one or more embodiments, the upper-level controller (ULC) 301 can comprise the processor 306 (e.g., computer processing unit, microprocessor, classical processor and/or like processor). In one or more embodiments, a component associated with ULC 301, as described herein with or without reference to the one or more figures of the one or more embodiments, can comprise one or more computer and/or machine readable, writable and/or executable components and/or instructions that can be executed by processor 306 to facilitate performance of one or more processes defined by such component(s) and/or instruction(s). In one or more embodiments, the processor 306 can comprise the prediction component 308, obtaining component 310, cross correlation component 312, spatio-temporal correlation component 314, analytical model 317, training component 318, and/or communication component 319.

The processor 306 can be configured to control one or more components/elements of the ULC 301, such as the prediction component 308, obtaining component 310, cross correlation component 312, spatio-temporal correlation component 314, analytical model 317, training component 318, and/or communication component 319.

In one or more embodiments, the ULC 301 can comprise the machine-readable memory 304 that can be operably connected to the processor 306. The memory 304 can store computer-executable instructions that, upon execution by the processor 306, can cause the processor 306 and/or one or more other components of the ULC 301 (e.g., prediction component 308, obtaining component 310, cross correlation component 312, spatio-temporal correlation component 314, analytical model 317, training component 318, and/or communication component 319) to perform one or more actions. In one or more embodiments, the memory 304 can store one or more computer-executable components.

ULC 301 and/or a component thereof as described herein, can be communicatively, electrically, operatively, optically and/or otherwise coupled to one another via a bus 305 to perform functions of non-limiting system architecture 300, ULC 301 and/or one or more components thereof and/or coupled therewith. Bus 305 can comprise one or more of a memory bus, memory controller, peripheral bus, external bus, local bus and/or another type of bus that can employ one or more bus architectures. One or more of these examples of bus 305 can be employed to implement one or more embodiments described herein.

In one or more embodiments, ULC 301 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 300 can reside in the cloud, and/or can reside locally in a local computing environment (e.g., at a specified location(s)).

In addition to the processor 306 and/or memory 304 described above, ULC 301 can comprise one or more computer and/or machine readable, writable and/or executable components and/or instructions that, when executed by processor 306, can facilitate performance of one or more operations defined by such component(s) and/or instruction (s).

Turning now to the processor 316, memory 313 and bus 315 of the lower-level controller (LLC) 311, in one or more embodiments, the LLC 311 can comprise the processor 316 (e.g., computer processing unit, microprocessor, classical processor and/or like processor). In one or more embodiments, a component associated with LLC 311, as described herein with or without reference to the one or more figures of the one or more embodiments, can comprise one or more computer and/or machine readable, writable and/or executable components and/or instructions that can be executed by processor 316 to facilitate performance of one or more processes defined by such component(s) and/or instruction (s). In one or more embodiments, the processor 316 can comprise the detection component 320.

The processor 316 can be configured to control one or more components/elements of the LLC 311, such as the detection component 320.

In one or more embodiments, the LLC 311 can comprise the machine-readable memory 313 that can be operably connected to the processor 316. The memory 313 can store computer-executable instructions that, upon execution by the processor 316, can cause the processor 306 and/or one or more other components of the LLC 311 (e.g., detection component 320) to perform one or more actions. In one or more embodiments, the memory 313 can store one or more computer-executable components.

LLC 311 and/or a component thereof as described herein, can be communicatively, electrically, operatively, optically and/or otherwise coupled to one another via a bus 315 to perform functions of non-limiting system architecture 300, LLC 311 and/or one or more components thereof and/or coupled therewith. Bus 315 can comprise one or more of a memory bus, memory controller, peripheral bus, external bus, local bus and/or another type of bus that can employ one or more bus architectures. One or more of these examples of bus 315 can be employed to implement one or more embodiments described herein.

In one or more embodiments, LLC 311 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the non-limiting system architecture 300 can reside in the cloud, and/or can reside locally in a local computing environment (e.g., at a specified location(s)).

In addition to the processor 316 and/or memory 313 described above, LLC 311 can comprise one or more computer and/or machine readable, writable and/or executable components and/or instructions that, when executed by processor 316, can facilitate performance of one or more operations defined by such component(s) and/or instruction (s).

Turning now to additional elements of the ULC 301 and the LLC 311, direction first turns to the LLC 311, and still to FIG. 3.

Generally, the detection component 320 can obtain first data from another radio network source, such as the radio network source 340, an RU, and/or the like, and/or from the LLC 311 itself. For example, the detection component 320 can actively search for and/or request data regarding network KPIs from RU/DU/CU components communicatively coupled to the LLC 311. The obtained and/or detected information can comprise data, metadata, values, metrics and/or the like defining current performance, and thus, in one or more cases, at least partially defining an anomaly that can occur, is occurring and/or has occurred.

The lower-level controller 311 further can transmit and/or otherwise communicate the cell-level first data, associated metrics defining the anomaly (e.g., occurred and/or likely anomaly), and/or relevant data related to user mobility patterns, device densities and/or the like to the upper-level controller 301 (e.g., Non-RT RIC).

The upper-level controller 301 can, in one or more cases, maintain global information for regions under its control (e.g., under network coverage), such as collected from several nRT-RICs at the upper-level controller 301 or at a KB communicatively coupled to the upper-level controller 301. A suitable KB can be disposed at the radio network 302 and/or external to the radio network 302.

Turning now to the additional elements of the ULC 301, based on this information transmitted and/or otherwise communicated to the upper-level controller 301, a generation of a cross correlation and a spatio-temporal correlation of data from network equipment of the radio network can be initiated.

First, generally, the obtaining component 310 can obtain first data from a radio network source 340 or another radio network source, such as the LLC 311 itself, which can be considered a radio network source of the radio network 302. The first data can be cell-level data that can comprise performance data, such as current performance data or real time performance data, of the respective radio network source, of another radio network source, of user entities accessing the radio network source, of the radio network generally, and/or the like. The first data can be in any suitable format and can comprise metadata.

The obtaining component 310 can obtain the first data comprising first and second metrics. For example, first metrics, of the first data, can correspond to cell-level data of a first cell for which an issue is occurring and/or for which a cell-level anomaly has been predicted. The second metrics can correspond to one or more additional cells in a neighborhood of the first cell, such as to which the anomaly could propagate. As used herein, a neighborhood is defined spatially, such as those cells within a threshold distance (e.g., a radius) from the first cell.

The obtaining component 310 further can obtain second data from one or more external sources, e.g., external source 350, that is external to and not comprised by the radio network 302. The external source 350 can comprise, without being limited thereto, a weather component, weather device, social network, social network device, and/or user entity (e.g., user device). The second data can comprise data, such as current or real time data, that is respectively related to performance of the radio network 302. For example, weather data can comprise data defining weather patterns, social network data can comprise events and/or social network access patterns, and/or user entity data can comprise velocity data and/or other directional movement data of user entities, such as those accessing the radio network 302. The second data can be in any suitable format and can comprise metadata.

In one or more embodiments, the obtaining component 310 can identify one or more metrics (e.g., parameters, context, values and/or the like) that specifically define the anomaly. For example, such data can be transmitted to the ULC 301 by the LLC 311, communicatively coupled to and/or comprised by a cell of the radio network 302 at which the anomaly has occurred. This anomaly metric data can be the same and/or different than the first data. It is noted that the anomaly still can be occurring, and thus analysis discussed herein can be performed in real time (e.g., during occurrence of the anomaly).

The obtaining component 310 can obtain, such as receive, determine, locate, look up and/or the like, the first data, the second data and/or the metrics defining the anomaly.

The prediction component 308 can, based on the obtained and/or detected first data, generate a prediction of occurrence of an anomaly at the radio network, and particularly at an RU of the radio network that is controlled by the lower-level controller 311 (e.g., nRT-RIC). For example, an anomaly can be predicted using a performance metric at a cell of the radio network 302, which performance metric has been determined to have changed by at least a defined deviation from a specification for the performance metric. This prediction can be a cell-level prediction, such as being limited to one cell, or even one RU of a cell. As used herein, a cell can refer to an RU or a group of RUs, which cell further can comprise a DU/CU.

Generally the ULC 301, and particularly the spatio-temporal correlation component 314 can analyze data, such as from the first cell (e.g., for which the cell-level prediction was made) and other cells, such as within the threshold neighborhood of the first cell, to generate a spatio-temporal correlation. As used herein, and as described above, the spatio component can refer to physical distance along the radio network, such as from cell-to-cell. As used herein, and as described above, the temporal component can refer to time based propagation of metrics, such as those related to KPI degradation related to the anomaly, within the radio network.

Regarding any relationship between the cross correlation and the spatio-temporal correlation, the cross correlation between similar quantities/KPIs in respective cells can indicate if the KPIs are in fact correlated with each other. Spatio-temporal correlation deals with measuring how likely (or unlikely) an activity/anomaly detected in cell can appear in another cell at a future time.

In one or more embodiments, data employed by the spatio-temporal correlation component 314 can be external data, such as from the external source 350. As indicated above, such external data can comprise user movement data, GPS data and/or the like. In an example, weather and/or social network data can allow for prediction of direction or even time of movement of users within the radio network, and thus can be employed to predict propagation of one or more KPIs and/or other metrics related to the anomaly, by the spatio-temporal component 314. Additionally and/or alternatively, such movement and/or direction information can be obtained from the radio network side, e.g., internal to the radio network.

External data is that data that is provided by sources external to the network. Such non-network data can cause an anomaly in the network, such as of a network KPI. Such external data can comprise use entity (UE) mobility, weather reports and/or social network load, without being limiting. UE mobility can be calculated using UE's GPS information, such as reported by third generation partnership project (3GPP) defined minimization driving test (MDT). UE mobility data can be used to detect if there is a traffic jam which can cause a temporary degradation in network performance, which can be a network anomaly and/or lead to a network anomaly. Weather report data can comprise humidity, temperature, rainy days, storm patterns, and/or the like. Social network load data can be measured from traffic load of defined quality of service class identifier/5G quality of service identifier (QCI/5QI) or from deep packet inspection on the core network to identify the IP address of social network websites and/or detect the amount of traffic thereof. As used herein, 5QI can be an indicator that represents the level of quality of service desired for certain data units. This can allow for identification of data networks and general type of contents carried by the data networks. As used herein, a core network can be a backbone network that connects a radio network (RAN) and users (e.g., user entities) to wider internet services and/or other operator networks, such as including social network sites, weather stations, and/or the like. A core network can monitor and identify the IP address(es) of respective data network names (DNNs).

In one or more embodiments, data employed by the spatio-temporal correlation component 314 can be obtained from a knowledge base (KB) such as based on historical trends of KPI propagation (e.g., spatially-related and/or temporally-related). Such historical data can be correlated, such as by the spatio-temporal correlation component 314, to current data from the cells of the radio network to find one or more correlations (e.g., similarities) between historical data and current data to aid in spatio-prediction, temporal-predication and/or both of propagation of a KPI metric, and thus of an anomaly. A suitable KB can be disposed at the radio network 302 and/or external to the radio network 302.

As a result of the correlations generated by the spatio-temporal correlation component 314, to be further defined below relative to FIGS. 4-7, the spatio-temporal correlation component 314 can identify a subset of additional cells, excluding the first cell and the second cell, that is determined to be non-spatio-temporally correlated to the affected cell, wherein the prediction is not generated for the subset of the cells. Likewise, the spatio-temporal correlation component 314 additionally and/or alternatively can identify a subset of additional cells of the radio network, other than just a second cell of the radio network, and thus excluding the first cell and the second cell, that is determined to be spatio-temporally correlated to the first cell or to the second cell, wherein the global prediction is further generated for and communicated to the subset of additional cells.

Discussion now turns to the cross correlation component 312. Generally, the ULC 301, and particularly the cross correlation component 312, can analyze data comprising the first data and the second data, and can generate, based on the analysis, a cross correlation using cell-level KPIs such as cell traffic load due to incoming handover, number of handover attempts between the neighboring cells, number of transmitted packets, number of user-per-cell, physical resource block (PRB) utilization and/or CU/DU utilization. For example, a throughput KPI can be defined as a total number of bits divided by slot durations with data transmitted over the air, a packet KPI can be defined as average time taken between packet transmission and acknowledgement, and/or a block error rate KPI can be defined as a percentage of transport blocks for which a user entity (UE) reported a negative acknowledgement.

More particularly, the cross correlation component 312 can generate a cross correlation of a first metric value (e.g., a KPI), measured according to a defined metric (e.g., a KPI default value and/or range) from a first cell of the radio network (e.g., for which the cell-level prediction was made) and a second metric value (e.g., another KPI or same KPI), according to the defined metric) from at least one other cell of the radio network (e.g., such as within a threshold neighborhood of the first cell).

In one or more embodiments, data employed by the cross correlation component 312 can be external data, such as from the external source 350. As indicated above, such external data can comprise user movement data, GPS data and/or the like. In an example, weather and/or social network data can allow for prediction of direction or even time of movement of users within the radio network, and thus can be employed to predict propagation of one or more KPIs and/or other metrics related to the anomaly, by the cross correlation component 312. Additionally and/or alternatively, such movement and/or direction information can be obtained from the radio network side, e.g., internal to the radio network. For example, the ULC 301 can correlate the first data from the radio network source 340/311 and the second data from the external source 350 to the metrics defining the anomaly.

In one or more embodiments, data employed by the cross correlation component 312 can be obtained from a knowledge base (KB) such as based on historical trends of KPI propagation (e.g., spatially-related and/or temporally-related). Such historical data can be correlated, such as by the cross correlation component 312, to current data from the cells of the radio network to find one or more correlations (e.g., similarities) between historical data and current data to aid in spatio-prediction, temporal-predication and/or both of propagation of a KPI metric, and thus of an anomaly. A suitable KB can be disposed at the radio network 302 and/or external to the radio network 302.

Further, the cross correlation component 312 can generate a correlation threshold that can define a KPI limit. As an example, thresholds can define limits as to allowable deviation of one or more KPIs from a norm, specified and/or default value and/or range. The correlation threshold can be employed as a check on output of the cross correlation. For example, where the correlation threshold is not satisfied (e.g., met and/or crossed), it can be predicted that an anomaly KPI will not continue to propagate generally and/or that an anomaly KPI will not continue to propagate in a particular direction, at a particular velocity, or to a particular region and/or cell.

Such correlation threshold can be initially defined by an administrator entity, such as using a device communicatively coupled to the network equipment of the radio network. The correlation threshold alternatively can be initially defined by the upper-level controller 301, such as by the cross correlation component 312. In one or more embodiments, the cross correlation component 312 can update the correlation threshold based on data obtained, such as from the lower-level controllers (e.g., lower-level controller 311).

Based on satisfying the correlation threshold, and based on the results of the cross correlation and the spatio-temporal correlation, a global prediction of direction, speed and/or time of propagation of the anomaly can be predicted, such as by the spatio-temporal correlation component 314. That is, the spatio-temporal component 314 can aggregate the cross correlation data, spatio-temporal correlation data, anomaly metric data, and correlation threshold data to make the global prediction as to direction, speed, timing and/or the like of an anomaly to the one or more identified cells (e.g., those identified by the spatio-temporal correlation).

This global prediction can be communicated, such as by the communication component 319, to any one or more cells that have been identified by the spatio-temporal correlation component 314 as being likely to experience the anomaly. The communication component 319 can comprise any software and/or hardware suitable for transmitting such communication from the respective Non-RT RIC to the respective nRT-RICs, for example.

In one or more embodiments, the ULC 301 can comprise an analytical model 317. The analytical model 317 can be, can comprise and/or can be comprised by a classical model, such as a predictive model, neural network, and/or artificial intelligent model. An artificial intelligent model and/or neural network (e.g., a convolutional network and/or deep neural network) can comprise and/or employ artificial intelligence (AI), machine learning (ML), and/or deep learning (DL), where the learning can be supervised, semi-supervised, self-supervised, semi-self-supervised and/or unsupervised. For example, the analytical model 317 can comprise a ML model.

The analytical model 317 generally can accordingly analyze known data, such as historical data from an external source and/or radio network source, such as stored at a suitable knowledge base communicatively coupled to the radio network 302. In one or more cases, the analytical model 317 can make a prediction as to a metric defining propagation of an anomaly (e.g., direction, velocity, timing, etc.) and/or a prediction defining one or more cells to which the anomaly is likely to propagate. That is, the analytical model 317 can be employed by the spatio-temporal correlation component 314 to make the initial correlation as to one or more cells to which the anomaly is likely to propagate, by the second correlation component 312 to make the cross correlation as to propagation of the anomaly, by the cross correlation component 312 to define and/or update the correlation threshold to bound the results of the second correlation, and/or to aggregate this data to make the global prediction as to direction, speed, timing and/or the like of an anomaly to the one or more identified cells. Likewise, the analytical model 317 can direct updating of a correlation threshold upon determination of new KPI metric data defining a KPI on which the respective correlation threshold is based.

Alternatively, it will be appreciated that the radio network 302 can function absent use of the analytical model 317, such as based on comparison of data from the KB s, real time data from the lower-level controllers, and external data from the external sources 350.

Generally, the analytical model 317 can be trained, such as by the training component 318, on a set of training data that can represent the type of data for which the system will be used. That is, the analytical model 317 can be trained on historical data related to network performance and/or on historical data related to external occurrences, such as those that have affected network performance.

A suitable KB can be disposed at the radio network 302 and/or external to the radio network 302. Such KB can be updated upon determination by the ULC 301 that a previously known KPI metric has changed, that an unknown external source cause has been identified, that an unknown radio network source cause has been identified, and/or that any unknown data has been identified, such as on which the analytical model 317 has not yet been trained, such as by the training component 318.

In this way, the topology information at the KB can be maintained and updated dynamically, such as automatically, by the ULC 301, such as being updated by the training component 318.

It is noted that the KB and/or the analytical model 317 can be updated at any suitable frequency, such as a regular frequency, upon demand, or upon determination of new data, such as by the training component 318 and/or other component of the ULC 301.

Figure 4:
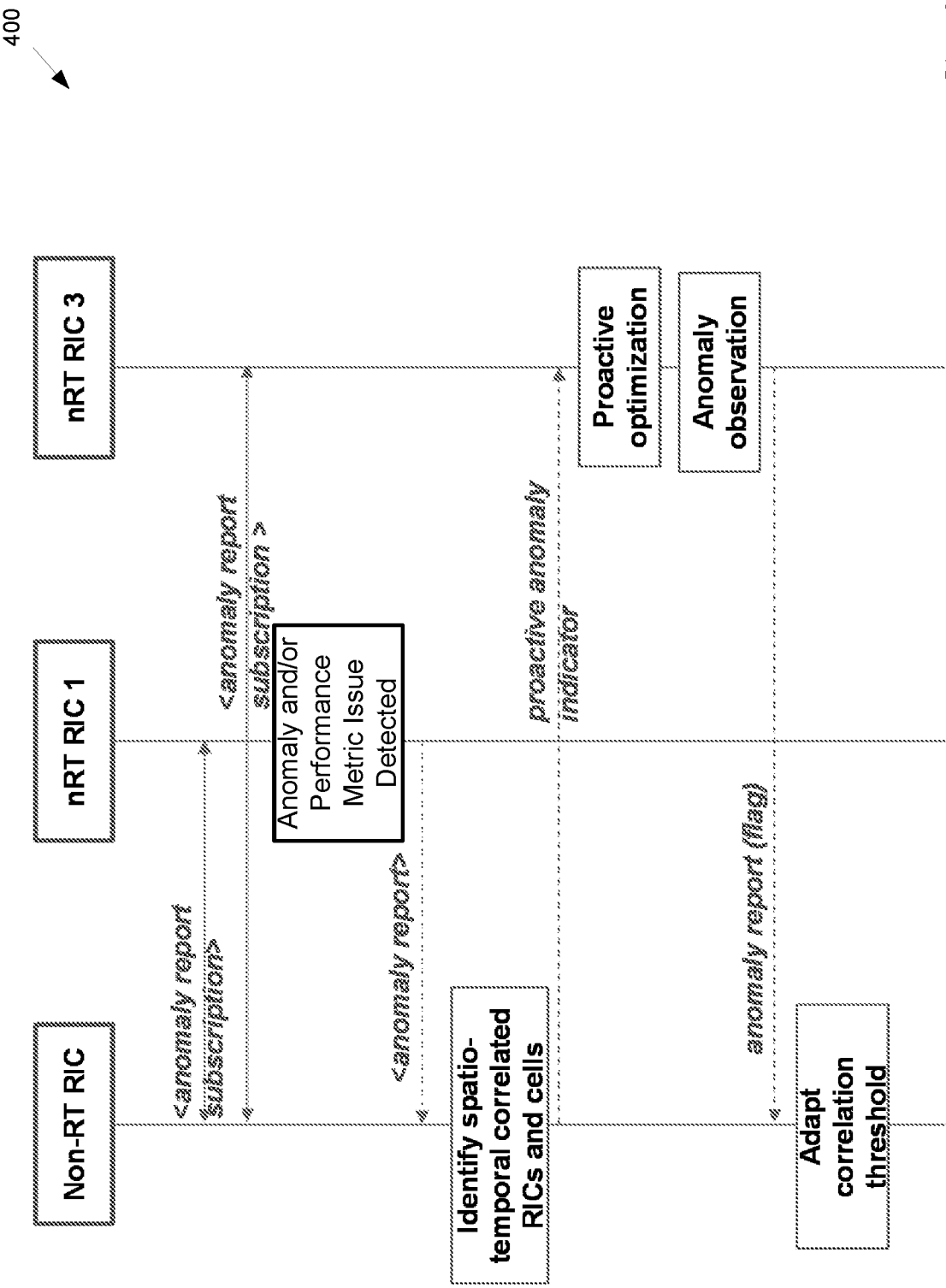
FIG. 4 illustrates an inter-RIC signaling diagram for O-RAN anomaly propagation determination, such as by the radio network of FIG. 3, in accordance with one or more embodiments and/or implementations described herein.

In view of general understanding of the radio network 302, direction now turns to FIG. 4 in addition to still referring to FIG. 3. FIG. 4 illustrates an inter-RIC signaling diagram 400 for O-RAN anomaly propagation prediction, such as by the radio network 302 of FIG. 3. One or more elements, objects and/or components referenced in the signaling diagram 400 can be those of radio network 100, 200 and/or architecture 300. Repetitive description of like elements and/or processes employed in respective embodiments is omitted for sake of brevity. Likewise, the processes and/or operations of the signaling diagram 400 also can be applicable to the radio network 100, 200 and/or architecture 300.

Generally, as illustrated at FIG. 4, inter-RIC signaling can be employed for communication between nRT-RICs and between a non-RT RIC and one or more nRT-RICs. If any of the nRT-RICs detect and/or predict an anomaly or an issue with a performance metric of a cell being monitored/controlled by the respective nRT-RICS, the respective nRT-RIC, having made the detection, can transmit information defining the anomaly to the non-RT RIC (e.g., the non-RT RIC corresponding to the nRT-RIC and/or to which the respective nRT-RIC is responsive). The non-RT RIC can detect the spatio-temporally correlated nRT-RICs, and can send to them a proactive anomaly indicator, such as a message indicating prediction of propagation of the anomaly. The notified nRT-RICs can perform proactive optimization and can send anomaly report flags to the non-RT RIC to indicate actual or false occurrence of the propagation. For example a true flag can indicate occurrence of the anomaly, or a false flag can indicate non-occurrence of the anomaly. This information (e.g., an anomaly report) can be employed as feedback, such as by the analytical model 317 and/or spatio-temporal correlation component 314, to update a correlation threshold.

An advantage of the signaling processes illustrated at the diagram 400 can be proactive mitigation and/or prevention of issues, such as KPI degradation, that can be caused by the propagation of an anomaly within the radio network.

Figure 5:
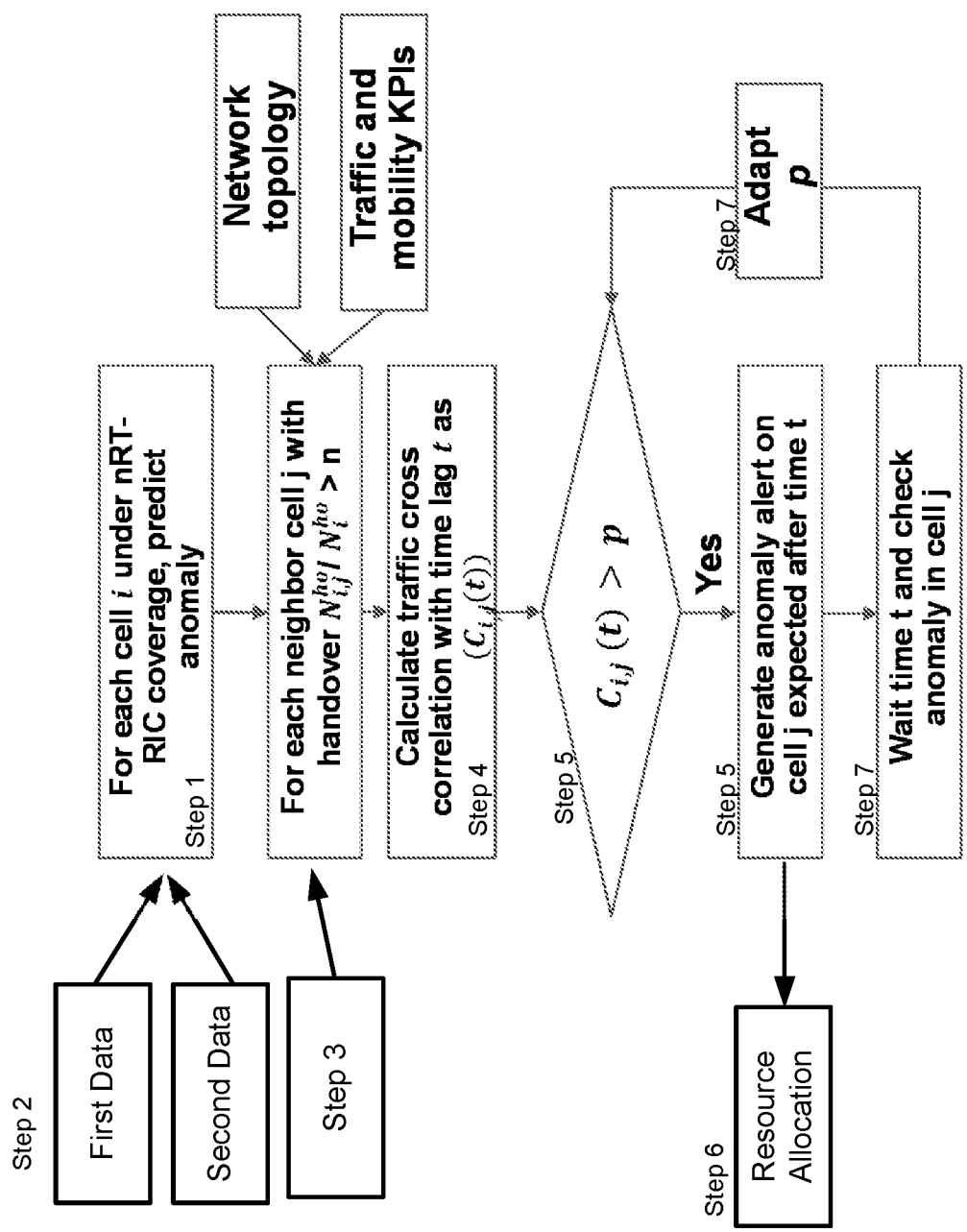
FIG. 5 illustrates a high-level flow chart of processes that can be performed by the radio network as depicted at FIG. 3, in accordance with one or more embodiments and/or implementations described herein.
Figure 6:
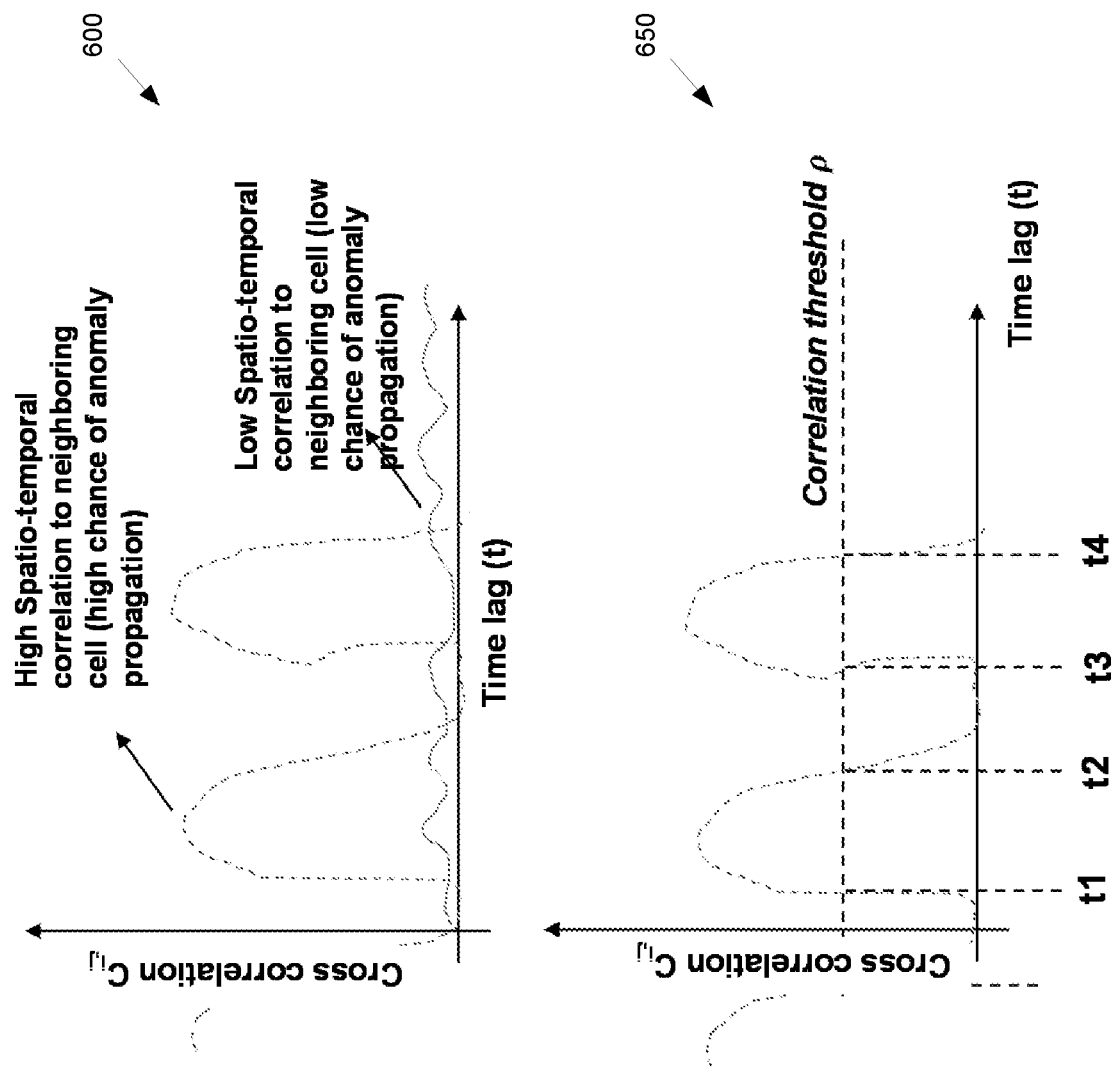
FIG. 6 illustrates a pair of graphs representing spatio-temporal traffic load anomaly prediction, such as by the radio network of FIG. 3, in accordance with one or more embodiments and/or implementations described herein.
Figure 7:
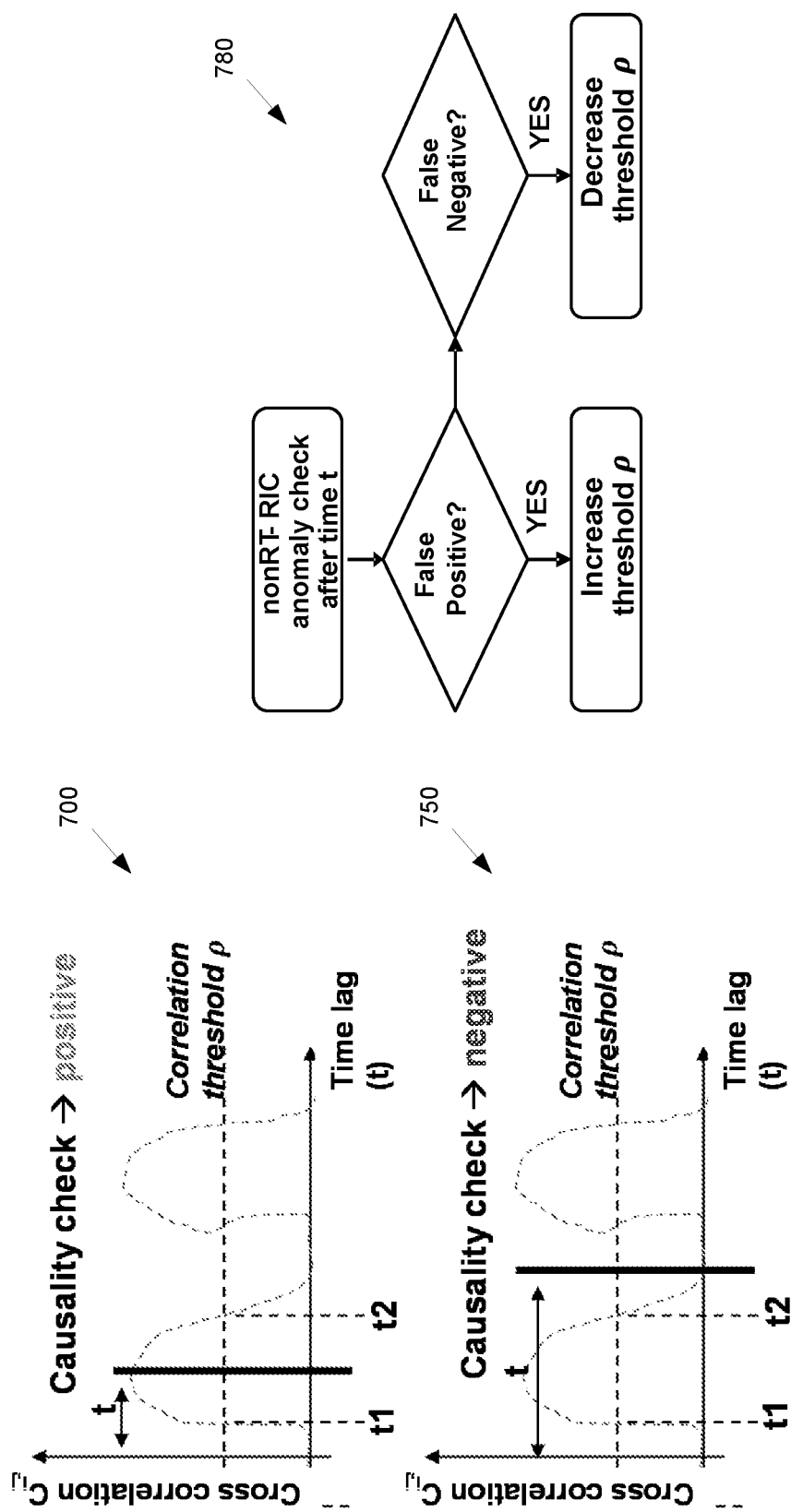
FIG. 7 illustrates another a pair of graphs representing spatio-temporal traffic load anomaly prediction, such as by the radio network of FIG. 3, in accordance with one or more embodiments and/or implementations described herein.

To provide further illustration of how the one or more processes and/or operations discussed above relative to FIGS. 3 and 4 can be provided and/or executed, direction next turns to FIGS. 5, 6 and 7.

Turning first to FIG. 5, illustrated is a high-level process flow schematic 500 illustrating one or more processes that can be performed by the radio network 302 of FIG. 3.

At schematic 500, a series of high-level steps are illustrated. One or more elements, objects and/or components referenced in the schematic 500 can be those of radio network 100, 200 and/or architecture 300. Repetitive description of like elements and/or processes employed in respective embodiments is omitted for sake of brevity. Likewise, the processes and/or operations of the schematic 500 also can be applicable to the radio network 100, 200 and/or architecture 300.

As illustrated, inputs, such as the first data and second data, can comprise network topology data and/or KPI data. Network topology data can comprise geographic location of cells, such as available at a respective radio planning and/or optimization tool of the network. As but some non-limiting examples of KPIs employed in the examples of FIGS. 5-7, traffic KPI can be denoted as b, being the total amount of transmitted bits over a certain interval (e.g., measured in units of minutes), and mobility KPI can be based on the number of handover attempts between neighboring cells.

Step 1 can comprise detecting and/or predicting a cell-level anomaly at an nRT-RIC, such as by the lower-level controller 311. The cell anomaly detection can employ an existing framework, such as traffic load KPI>a specified threshold for traffic load. For example, for each cell i in the network topology with a detected anomaly, the anomaly decisions can be informed to the Non-RT RIC, such as the upper-level controller 301.

Step 2 can comprise collecting KPI data, such as handover and load KPI data for making the cross correlation. For example, each nRT-RIC can report the following KPIs to the Non-RT RIC:
 a. $N_{i,j}^{ho}$=Number of handover attempts from cell i and cell j;
 b. $N_i^{ho}$=total number of handover attempts from cell i to all its neighbors j; ($\Sigma_{j\in J} N_{i,j}^{ho}$);
 c. $L_{j,i}^{ho}$=total number of scheduled bits on cell j for UEs who were admitted through handover from cell i; and
 d. $L_j$=total number of scheduled bits on cell j for all UEs (incoming handovers or cell selection).

Step 3 can comprise initial filtering of neighbors. For example, neighbors with low ratio of handover ($N_{i,j}^{ho}/N_i^{ho} < x$) can be deemed to be spatially uncorrelated and thus removed from the next steps.

Step 4 can comprise determining a mobility-based traffic profile. For example, for each cell with handover $N_{i,j}^{ho}/N_i^{ho} > n$, traffic cross correlation can be calculated with time lag t as $C_{i,j}(t)$. It will be appreciated that the cross correlation or the spatio-temporal correlation can be performed in any order.

For example, based on cell traffic and handover (e.g., the exemplary KPIs employed at FIGS. 5-7), cross correlation ($\sigma_{a,b}$) between $L_{j,i}^{ho}$ and $L_j$ can be such that:
a.

$$C_{i,j}(t) = \rho_{a,b} = \frac{\gamma_{a,b}}{\sqrt{(\sigma_a^2 \sigma_b^2)}},$$

where $a \in L_j$, $b \in L_{j,i}^{ho}$, and $\sigma$ denotes the variance; and
b.

$$\gamma_{a,b} = \frac{1}{T} \sum_{t=1}^{T} \left[(a - \overline{L}_j)(b - \overline{L_{j,i}^{ho}})\right],$$

where $\gamma$ is covariance, $\overline{L}$ indicates the mean value of L).

For example, as shown at FIG. 6, graph 600, a spatio-temporal correlation can be graphically represented as a time lag (t) vs. cross correlation $C_{i,j}$. The graph generally represents the time-wise correlation between quantities i,j. The dotted line indicates the instances/entities with high correlation. The solid line indicate instances/entities with low correlation with respect to time. High spatio-temporal correlation to neighboring cells can represent high chance of anomaly propagation. Low spatio-temporal correlation to neighboring cells can represent low chance of anomaly propagation.

Step 5 can comprise a causality check and anomaly prediction. This can comprise calculating one or more time lags at which the cross correlation is above threshold $\rho$ (i.e., $C_{i,j}(t) > \rho$). Turning to FIG. 6, and also still to FIG. 5, the graph 650 depicts [t1,t2] and [t3,t4]. At each of times t1-t4, the correlation is over the threshold. Between the time window indicated (i.e. window [t1,t2] and window [t3,t4]), the cross-correlation is above the threshold.

Further, user's velocity (v) and distance (d) between cell i and j can be calculated, and the time that the user takes to move from cell i to j=$t_{i,j}$=0.5*d/v also can be calculated. The distance (d) can be calculated from the network topology containing a plurality of cells, and velocity (v) can be estimated using the change in timing advance or from UE's minimization of drive test (MDT) report.

The causality check of the global prediction can be represented by the following substeps, and is illustrated at FIG. 7, graphs 700 and 750:
a. IF time $t_{i,j}$ overlaps with the identified high correlation lags, then
    a. Anomaly is predicted in cell j, non-RT RIC will inform the near-RT RIC connected to this neighbor cell j, and Step 7 is executed to adapt the threshold;
b. ELSE
    a. No causality is expected between cell i and j; no anomaly predicted;
c. ENDIF; and
d. Step 4 is repeated for cell j+1.

At the graphs 700 and 750, the causality check can be completed by calculating the user velocity to estimate the time instance at which the users (or traffic flow) will arrive at the neighboring cell. If the arrival instance overlaps with the time window in which both cells have a high correlation (above the threshold), then an anomaly propagation can be expected due to the user (traffic flow) from the anomalous cell. For example, at graph 700, the arrival instance overlaps a time window in which both cells have a high correlation, and thus the causality check is positive. Differently, at graph 750, the arrival instance is at a time t that is past the first window and prior to the second window, and thus does not overlap a time window in which both cells have a high correlation, and thus the causality check is negative.

Step 5 further can comprise generating an anomaly alert on cell j that an anomaly is expected after time t.

Step 6 can comprise resource allocation and/or other mitigation and/or preventive measures that can be taken by the radio network and/or by an administrator entity relative to cell j.

Step 7 can comprise determining whether to update and/or adapt the cross correlation threshold. This step can comprise the following substeps:
a. IF the predicted anomaly did not happen after time t, then
    a. Increase the threshold p;
    b. ELSEIF an unpredicted anomaly was detected after time t, then
        a. Decrease the threshold p; and
c. ENDIF.

For example, as illustrated at flow chart 780 of FIG. 7, the threshold p can be increased where a false positive of anomaly propagation was communicated, or the threshold p can be decreased where a false negative of anomaly propagation was communicated. Otherwise, the threshold p can be maintained.

Turning now to FIG. 8, a process flow comprising a set of operations is illustrated relative to FIGS. 2 and 4 for analyzing a network topology and for selecting a node of the network topology based on the analysis, in accordance with one or more embodiments described herein. One or more elements, objects and/or components referenced in the process flow 800 can be those of system 200 and/or system 400. Repetitive description of like elements and/or processes employed in respective embodiments is omitted for sake of brevity. Likewise, the processes and/or operations of the process flow 800 also can be applicable to the system 300.

At operation 802, the method 800 can comprise determining, by a network equipment that is part of a radio network and comprising a processor (e.g., detection component 320 of lower-level controller 311), that a performance metric at the first cell of the radio network has changed by at least a defined deviation from a specification for the performance metric.

At operation 804, the method 800 can comprise generating, by the network equipment (e.g., prediction component 308 of upper-level controller 301), based on the determining, a cell-level prediction of an anomaly at the first cell.

At operation 806, the method 800 can comprise initiating, by the network equipment (e.g., processor 306), the generation of the cross correlation and the spatio-temporal correlation upon generating a cell-level prediction of an anomaly having occurred at the first cell.

At operation 808, the method 800 can comprise, generating, by the network equipment (e.g., cross correlation component 312), a cross correlation of a first metric value, measured according to a defined metric, from a first cell of the radio network and a second metric value, measured according to the defined metric, from a second cell of the radio network.

At operation 810, the method 800 can comprise generating, by the network equipment (e.g., spatio-temporal correlation component 314), a spatio-temporal correlation, for the second cell, defining a spatio-temporal relationship between the first cell and the second cell.

At operation 812, the method 800 can comprise generating, by the network equipment (e.g., spatio-temporal correlation component 314), based on a result of the spatio-temporal correlation, a distance-based threshold that is used to generate the global prediction.

At operation 814, the method 800 can comprise generating, by the network equipment (e.g., spatio-temporal correlation component 314 and/or analytical model 317), a global prediction, based on the cross correlation and on the spatio-temporal correlation, of propagation of an anomaly from the first cell to the second cell.

At operation 816, the method 800 can comprise communicating, by the network equipment (e.g., communication component 319), the global prediction to a device of the network equipment at the second cell.

At operation 818, the method 800 can comprise identifying, by the network equipment (e.g., analytical model 317), a subset of additional cells of the radio network, excluding the first cell and the second cell, that is determined to be spatio-temporally correlated to the first cell or to the second cell, wherein the global prediction is further generated for and communicated to the subset of additional cells.

At operation 820, the method 800 can comprise directing, by the network equipment (e.g., processor 306), allocation of resources to the second cell to address the global prediction by performing a mitigation or elimination of a potential for the anomaly to occur at the second cell, or causing, by the network equipment (e.g., communication component 319), the second cell to allocate resources to address the global prediction by the mitigation or the elimination of the potential for the anomaly to occur at the second cell, by the communicating to the second cell.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of diagrams 400, 500, 600 and/or 800 are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, provided is a radio system that can comprise a lower-level controller, of a radio network, that is responsive to and provided at a level of hierarchy lower than an upper-level controller of the radio network, and the upper-level controller that generates a cell-level prediction of an anomaly at a first cell of a radio network based on cell-level data determined by the lower-level controller, wherein the upper-level controller generates a global prediction, based on the cell-level prediction, of propagation of the anomaly to a second cell of the radio network. The upper-level controller can generate the global prediction based on cross correlation of a first metric value, of the cell-level data, measured according to a defined metric, from the first cell and a second metric value, measured according to the defined metric, from the second cell of the radio network. The upper-level controller further can determine whether a result of the cross correlation satisfies a correlation threshold for the defined metric.

An advantage of one or more embodiments of the aforementioned radio system, method and/or non-transitory machine-readable medium can be determining by the radio system a proactive prediction of anomaly occurrence. Rather than responding reactively, the radio system defined herein can, based on distance between cells and/or based on movement speed of users at and/or between cells, determine propagation of an anomaly at the radio network. Indeed, via proactive analysis of an anomaly, movement direction of the anomaly, and/or speed of movement of the anomaly, can be determined such as to proactively allocate resources so as to mitigate or prevent the anomaly at one or more cells of the network. This can be desired as compared to excessive delay in addressing an anomaly due to reactive anomaly metric analysis.

Yet another advantage can be employment of various types of metrics to determine propagation, such as from sources internal and/or external to the radio network. Sources internal to the radio network can comprise handover rates, traffic type, and/or the like. Sources external to the radio network can comprise weather data providers, social networks and/or user devices, such as those that have accessed a cell of the radio network.

Yet another advantage of the one or more embodiments described herein can be allowing for predictive maintenance of network equipment of cells of the network, such as based on information learned from metrics defining the propagation of an anomaly.

Even further, another advantage can be reduction in cost, such as time, energy, manual labor, power and/or the like that is directed to troubleshooting a radio network anomaly, and instead ability to at least partially target particular cells, such as relative to a particular temporal range, to mitigate and/or prevent KPI degradation that can be caused by an anomaly.

Moreover, in response to anomaly prediction, anomaly propagation tracking and/or addressing anomalies, satisfaction of user entities of a radio network can be increased, which can lead to greater potentials related to use of the radio network.

As described above, the one or more processes performed by one or more frameworks defined herein can be scalable. One or more cell-level predictions, global predictions, anomalies, metrics and/or the like can be determined, identified, and/or analyzed, such as in parallel with one another.

A practical application of the systems, computer-implemented methods and/or non-transitory computer-readable mediums described herein can be real time analysis of current performance metrics, such as current values for KPIs, from a plurality of cells of a radio network to allow for prediction of movement of an anomaly within the radio network. Overall, such computerized tools can constitute a concrete and tangible technical improvement in the field of radio network diagnostics, without being limited thereto.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide dynamic and real time radio network anomaly analysis, as compared to existing systems and/or techniques. Systems, computer-implemented methods and/or computer program products facilitating performance of these processes are of great utility in the fields of radio network diagnostics and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively analyze radio network KPI metrics, historical data and real time data in the time that one or more embodiments described herein can facilitate these processes. And, neither can the human mind nor a human with pen and paper electronically perform one or more of these processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
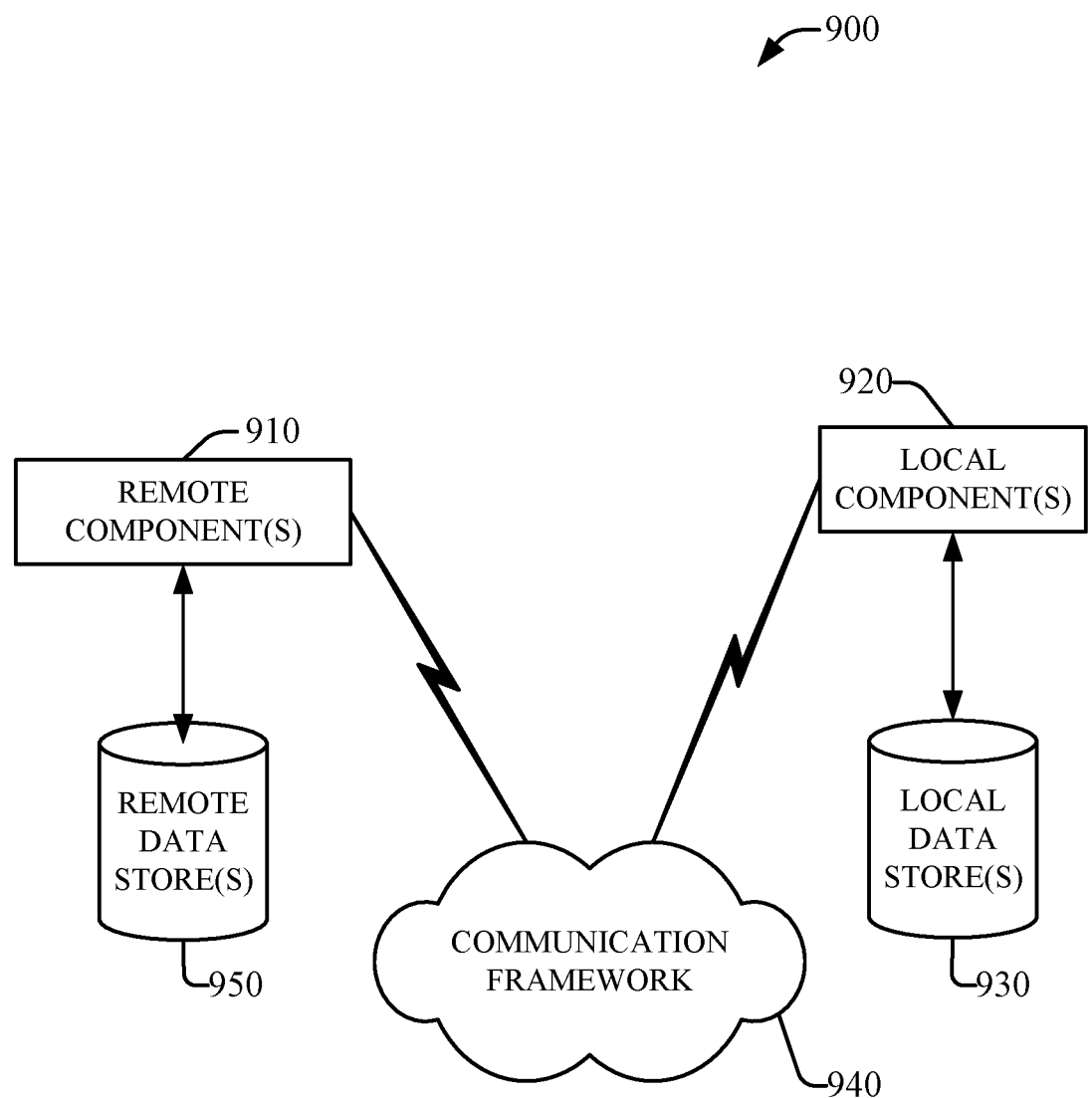
FIG. 9 illustrates a block diagram of an example operating environment with which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
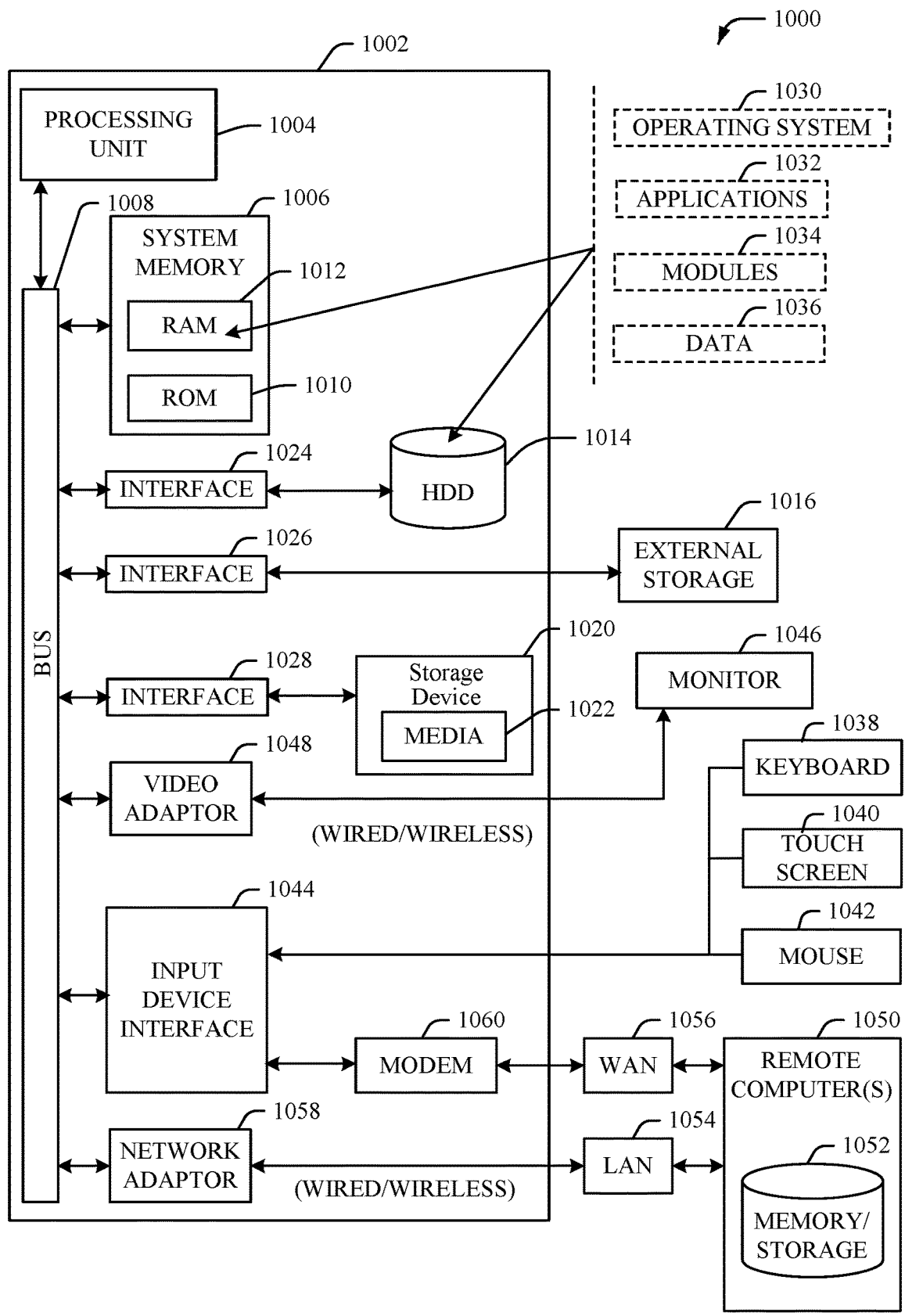
FIG. 10 illustrates an example schematic block diagram of a computing environment with which the subject matter described herein can interact and/or be implemented at least in part.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in the computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A radio system, comprising:
a lower-level controller, of a radio network, that is responsive to and provided at a level of hierarchy lower than an upper-level controller of the radio network; and
the upper-level controller that generates a cell-level prediction of an anomaly at a first cell of a radio network based on cell-level data determined by the lower-level controller,
wherein the generation of the cell-level prediction of the anomaly comprises a determination, by the upper-level controller, that a performance metric at the first cell of the radio network has changed by at least a defined deviation from a specification for the performance metric,
wherein the upper-level controller generates a global prediction, based on the cell-level prediction, of propagation of the anomaly to at least a second cell of the radio network,
wherein the global prediction being based on the cell-level prediction comprises the global prediction being based on a cross correlation between a first metric value of a defined metric of the first cell and a second metric value of the defined metric of the second cell, and on a spatio-temporal relationship corresponding to the cross correlation,
wherein the defined metric is determined as being related to the anomaly, and
wherein the spatio-temporal relationship comprises a movement or direction of propagation of the defined metric within the radio network.

2. The radio system of claim 1, wherein the upper-level controller further generates the global prediction based external data defining the movement or direction of propagation of the defined metric, and wherein the external data is obtained from a source disposed external to the radio network.

3. The radio system controller of claim 1, wherein the upper-level controller further determines whether a result of the cross correlation satisfies a correlation threshold for the defined metric.

4. The radio system controller of claim 3, wherein the upper-level controller obtains post-prediction performance data, from the second cell, defining whether the global prediction was correct, and updates the correlation threshold based on the post-prediction performance data.

5. The radio system of claim 1, wherein the upper-level controller is a non-real time radio intelligent controller, and wherein the lower-level controller is a near real time radio intelligent controller at the first cell of the radio network.

6. The radio system of claim 1, wherein the anomaly being predicted by the upper-level controller comprises determining, by the upper-level controller, that a performance metric at the first cell of the radio network has changed by at least a defined deviation from a specification for the performance metric, and wherein the performance metric is the same as the defined metric or is related to the defined metric.

7. The radio system of claim 1, wherein the upper-level controller further performs a spatio-temporal correlation defining the spatio-temporal relationship between the first cell and the second cell, and wherein the spatio-temporal correlation comprises use of social network data from a source external to the radio network.

8. The radio system of claim 1, wherein the upper-level controller or the lower-level controller causes the second cell to allocate resources to address the global prediction thereby mitigating or eliminating a potential for the anomaly to occur at the second cell.

9. A method, comprising:

generating, by network equipment that is part of a radio network and comprising at least one processor operatively coupled to at least one memory, a cross correlation of a first metric value, measured according to a defined metric, from a first cell of the radio network, and a second metric value, measured according to the defined metric, from a second cell of the radio network, wherein the defined metric is determined as being related to an anomaly;

generating, by the network equipment, a spatio-temporal correlation, for the second cell, defining a spatio-temporal relationship between the first cell and the second cell, wherein the spatio-temporal relationship comprises a movement or direction of propagation of the defined metric within the radio network; and communicating, by the network equipment, prediction information, defining a global prediction, based on the cross correlation and on the spatio-temporal correlation, of propagation of the anomaly from the first cell to the second cell, to a device of the network equipment at the second cell.

10. The method of claim 9, further comprising:

generating, by the network equipment, based on a result of the spatio-temporal correlation, a distance-based threshold defining a distance between cells, including the first cell and the second cell, of the radio network, that is used to generate the global prediction.

11. The method of claim 9, further comprising:

determining, by the network equipment, that a performance metric at the first cell of the radio network has changed by at least a defined deviation from a specification for the performance metric, wherein the performance metric is the same as the defined metric or is related to the defined metric; and generating, by the network equipment, based on the determining, a cell-level prediction of the anomaly at the first cell.

12. The method of claim 9, further comprising:

initiating, by the network equipment, the generation of the cross correlation and the spatio-temporal correlation upon generating a cell-level prediction of the anomaly having occurred at the first cell.

13. The method of claim 9, further comprising:

identifying, by the network equipment, a subset of additional cells of the radio network, excluding the first cell and the second cell, that is determined to be spatio-temporally correlated to the first cell or to the second cell, wherein the global prediction is further generated for and communicated to the subset of additional cells, and wherein the subset of additional cells is disposed along the direction of the propagation.

14. The method of claim 9, further comprising:

directing, by the network equipment, allocation of resources to the second cell to address the global prediction, thereby mitigating or eliminating a potential for the anomaly to occur at the second cell, or wherein the communicating of the global prediction to the second cell causes the second cell to allocate resources to address the global prediction, thereby mitigating or eliminating the potential for the anomaly to occur at the second cell.

15. A non-transitory machine-readable medium, comprising executable instructions that when executed by at least one processor operatively coupled to at least one memory, of a controller of network equipment of a radio network communicatively coupled to a group of cells of the radio network, facilitates performance of operations comprising:

obtaining, by the at least one processor, from a cell of the group of cells, a first metric defining a performance of the first cell;

obtaining, by the at least one processor, from a subset of additional cells of the group of cells, respective second metrics defining respective performances of the additional cells of the subset;

performing, by the at least one processor, a primary classification of the additional cells of the subset based on a primary cross correlation of the first metric and the second metrics to one another; and communicating, by the at least one processor, to the subset of additional cells of the group of cells, indication data comprising indication of a propagation of an anomaly that has occurred at the radio network to the subset of additional cells of the group of cells, wherein the indication data comprises movement data or direction data defining the propagation of the anomaly.

16. The non-transitory machine-readable medium of claim 15, wherein the operations further comprise:

performing, by the at least one processor, a secondary classification, being a spatio-temporal classification, of the additional cells of the subset of additional cells of the group of cells based on a distance metric defining a respective distance between the first cell and respective ones of the additional cells of the subset of additional cells of the group of cells.

17. The non-transitory machine-readable medium of claim 16, wherein the spatio-temporal correlation is performed, by the at least one processor, also based on velocities of movement of user devices having been authorized to access the additional cells of the subset, wherein the operations further comprise obtaining, by the at least one processor, velocity data defining the velocities of movement from a social media source disposed external to the radio network.

18. The non-transitory machine-readable medium of claim 15, wherein the operations further comprise:

comparing, by the at least one processor, the results of the cross correlation to a correlation threshold; and identifying, by the processor, one or more of the additional cells of the subset of cells having a respective result of the results that satisfies the correlation threshold as being predicted to experience a potential propagation of anomaly data, representative of the anomaly, to the identified ones of the additional cells of the subset.

19. The non-transitory machine-readable medium of claim 18, wherein the operations further comprise:

updating, by the at least one processor, the correlation threshold, based on data defining measured propagation of the anomaly as compared to the prediction.

20. The non-transitory machine-readable medium of claim 15, wherein the second metrics each comprise at least one of a traffic type metric, a handover rate metric, a cell vendor metric, or a cell configuration metric.

* * * * *